Aug. 4, 1964  R. GIACCONI ET AL  3,143,651
X-RAY REFLECTION COLLIMATOR ADAPTED TO FOCUS X-RADIATION
DIRECTLY ON A DETECTOR
Filed Feb. 23, 1961

Inventors
Riccardo Giacconi
Bruno B. Rossi 3,143,651
X-RAY REFLECTION COLLIMATOR ADAPTED TO FOCUS X-RADIATION DIRECTLY ON A DETECTOR
Riccardo Giacconi, Weston, and Bruno B. Rossi, Cambridge, Mass., assignors to American Science and Engineering, Inc., Cambridge, Mass., a corporation of Massachusetts
Filed Feb. 23, 1961, Ser. No. 91,180
16 Claims. (Cl. 250—105)

This invention relates to X-ray astronomy and more particularly to improved X-ray detecting instruments capable of sensing X-rays from sources located at great distances from the instrument and concentrating the sensed radiation on a suitable detector area.

In the investigation of X-rays which emanate from sources at a substantial distance from the detector it is desirable to utilize an instrument having high angular resolution so that the location of the X-ray source may be identified. A typical problem of this nature is in the study of solar and stellar X-rays. The few studies that have been performed to date have been carried out exclusively with instruments carried aloft in rockets and satellites as the atmosphere is highly opaque to electromagnetic radiation of wave lengths up to 2900 Angstroms. While sources of X-radiation of large magnitude (of solar origin) have been detected there have been no reports of weaker sources of X-radiation within the solar system or of X-radiation from sources outside the solar system. In these investigations a principal handicap arises from the fact that soft X-rays are peculiarly difficult to focus due to the high absorption and low reflectivity of all substances for such X-rays so that the use of conventional lens and mirror systems is precluded. In the work heretofore carried out narrow multi-channel collimator (bundles of hypodermic needles) and pinhole camera techniques have been used to obtain fine angular resolution of X-rays. Such techniques, however, decrease the available sensing area of the detectors, produce no intensification of the impinging radiation, and in the case of the multichannel collimator involve a field of view limited to the solid angle defined by the angular resolution. Also, background due in part to cosmic ray interaction in the detector and in part to thermal and other noise inherent in any detector system are limiting factors on the usefulness of such instruments.

Accordingly, it is an object of the invention to provide an improved instrument for detecting X-rays generated at sources positioned at substantial distances from the detecting apparatus.

Another object of the invention is to provide an improved X-ray detecting instrument which has fine angular resolution and provides several orders of magnitude of intensification of the incident X-rays.

Still another object of the invention is to provide an improved X-ray apparatus which is compact and capable of being carried aloft in satellites for performing studies of X-radiation from interplanetary, interstellar and intergallactic sources.

A further object of the invention is to provide an improved X-ray collimator structure.

In accordance with principles of the invention there is provided an X-ray detecting instrument including an X-ray collimating structure positioned between the entrance aperture and the detector area. The collimator has a series of optically smooth surfaces with each surface being disposed at an angle of grazing incidence to radiation from a distant source but at a slightly different angle from the other surfaces in the collimator. All of the surfaces are exposed to radiation from the distant source and are positioned to deflect impinging radiation onto the detecting area with at least a substantial degree of external reflection. In one form of the instrument the surface segments are disposed in a series substantially parallel to the axis of the instrument while in another form the surface segments are disposed substantially perpendicular to the axis of the instrument. In the disclosed embodiments the collimator structure is comprised of a plurality of ruled surfaces (surfaces generated by a straight line), each formed on a suitable substrate which is coated with a metallic coating and finished to an optical smoothness. These surfaces are either conical or planar in configuration. A radiation barrier is located in the entrance aperture on the axis of the instrument and is dimensioned to prevent radiation from impinging directly on the detector area while permitting radiation to impinge on the collimator surfaces. The detector area is a small fraction of the entrance aperture area. The detector in the preferred embodiment is an open cathode photomultiplier and suitable filters which pass selected wave lengths of the radiation incident on said collimator surfaces may be positioned between the collimator and the detector to permit detection of only certain selected wave lengths of the radiation.

The improved instrument of the invention, when used with orientable platforms now available, enables X-ray observations of great astrophysical importance. The instrument concentrates X-rays and makes possible the detection of faint X-ray sources far beyond the reach of prior art instruments and extends the range of X-ray observations to intensities down to approximately $10^{-5}$ quanta per square centimeter per second with angular resolutions as fine as a $10^{-4}$ radians. Among the problems that may be studied with this instrument are the observations of limb brightening of solar X-radiation, mapping of isophotes for X-rays on a solar surface or actual X-ray photography of the solar surface, study of the intensity and spectrum of X-rays from the moon and stars and X-ray studies of the "peculiar" A-stars and the remains of super novae, such as the Crab Nebula. The invention may be used both in searching for weak extended sources and weak "point" sources and in high resolution scanning of known X-ray sources.

Other objects and advantages of the invention will be seen as the following description of preferred embodiments thereof progresses in conjunction with the drawing, in which:

FIG. 1 is an exploded view, in perspective, of portions of the instrument according to one embodiment of the invention, including the collimator structure, housing and entrance aperture plates;

FIG. 2 is a sectional diagrammatic view of the X-ray detecting instrument embodiment shown in FIG. 1;

FIGS. 3a and 3b are exaggerated sketches of a portion of the collimator surfaces of the instrument shown in FIGS. 1 and 2;

FIG. 4 is an exploded view of an astigmatic reflection collimator structure, associated entrance aperture configuration and detector arrangement according to a second embodiment of the invention;

FIG. 5 is a sectional view of a portion of a second form of collimator structure constructed according to the principles of the invention; and FIG. 6 is a sectional view of a portion of the collimator structure of FIG. 5 taken along lines 6—6 of FIG. 5.

The X-ray detecting instrument shown in FIG. 1 includes a rectangular housing 10 in which is mounted X-ray detecting apparatus 12, radiation transmission filters 14, associated electronic circuitry generally indicated by the block 16, a collimator structure generally designated 18 and a front wall structure 20 that has an entrance aperture 22 centrally disposed therein. Supported within the entrance aperture is a shield 24 disposed on the axis of the instrument. The collimator structure 18 includes a series of rectangular glass plates 26 each of which have grooves in the edges 28 which cooperate with guide ridges 30 in the casing 19. The plates 26 are assembled together with the inner one positioned against steps 32 and are clamped in place when the front wall structure 20 is secured to the housing 10 by appropriate means. Each plate 26 has a conical aperture therethrough, the surface 34 of which is generated by a straight line and is termed herein a ruled surface. Each surface 34 is finished to optical smoothness and provided with an evaporated metal coating 36 (for example, silver). All of the ruled surfaces are disposed at angles of grazing incidence to radiation from a distant source passing through the aperture 22 in the entrance plate 20, that is, the angle of each ruled surface with the axis of the instrument falls in the range between 0° and 8°. Each surface is disposed at a different angle from the other surfaces in the series and is arranged so that parallel rays passing through the entrance aperture 22 are reflected toward a common focal area. X-radiation entering the instrument in a direction parallel to its axis impinges on the series of conical surfaces and is reflected therefrom through the transmission filter structure 14 to the X-ray detector 12 which in the preferred embodiment has a sensitive area one millimeter in diameter, this area being positioned on the axis of the instrument. The width of each surface exposed to such radiation is preferably equal as indicated in the diagrammatic sketches of FIGS. 3a and b. For this reason the thickness of the plates 26 decreases toward the rear of the collimating structure and the thickness of each is a function of the angle at which its surface 34 is disposed. For example in the sketches of FIG. 3 which are exaggerated in order to illustrate this point consider the surface of plate 26' to be disposed at an angle of 1° to the incident radiation, the surface of plate 26'' to be disposed at 1.3° and the surface of plate 26''' to be disposed at 2°. With a detector having an effective diameter of one millimeter the thickness of plate 26' would be approximately 28.5 millimeters, the thickness of plate 26'' would be approximately 21.4 millimeters and the thickness of plate 26''' would be approximately 14.3 millimeters. The exposed (projected) width, as viewed in FIG. 3a is 0.5 millimeter in each instance. It will be understood that this example is merely used to illustrate the gradation in thicknesses of several collimating plates 26 and that in the usual case the range of angles of adjacent plates would differ somewhat. In order to deflect radiation to the same detector area the angles at which the surfaces of the plates 26 are disposed increase from the plate nearest the front wall 20 to the plate nearest the detector 12 in well defined relation—approximating a paraboloidal curve.

The shield 24, which functions as a radiation barrier, may be any suitable material such as aluminum or steel that is opaque to cosmic radiation. This shield preferably is substantially the same shape as the aperture formed by the plate 26 closest to the detector so that maximum shielding of the detector is provided without blocking X-radiation parallel to the axis from impinging on any of the collimator surfaces. One or more filter elements such as a sheet of beryllium, aluminum or Mylar polyester film in the order of a few microns in thickness may be used in the transmission filter element 14 to permit selective transmission of certain frequencies of radiation of significant interest. The detector 12 may be of the windowless (open cathode) resistance strip magnetic photomultiplier type utilizing a strontium fluoride cathode for example.

The following table sets forth values for a collimator having silvered reflector surface segments disposed at angles of grazing incidence to impinging radiation over the range 1.3°–2.0° and with a reflection coefficient of 1.

| | | |
|---|---|---|
| $N$ = number of segments | 15 | 30 |
| $l$ = length of the system, cm | 100 | 100 |
| $R$ = radius of detector, cm | .1 | .05 |
| $a$ = resolution, radians | $10^{-3}$ | $5 \times 10^{-4}$ |
| $A$ = collective area, cm$^2$ | 40 | 40 |
| $G = A/\pi R^2$ | 1,280 | 5,120 |

The collecting area $A$ is a measure of the X-ray gathering power of the instrument and the ratio $G$ is an indication of the resulting signal to background noise as the main source of background noise is cosmic radiation (whose omni-directional intensity in outer space is in the order of two particles/cm.$^2$ sec.) and the arrangement of the instrument minimizes the effect of this radiation. This detector instrument is particularly useful for scanning distant sources of X-rays such as the sun in accordance with a predetermined program through the use of orientable platforms and recording X-ray intensity from the specific locations on the source being scanned.

A modification of the X-ray detecting instrument of FIG. 1 which is useful in searching operations is shown in FIG. 4. This instrument employs an astigmatic reflection collimator structure comprising two cooperating opposed series of planar reflecting surfaces 40 which in toto approximate paraboloidal curves. Each bar 42 may be similarly of glass or other suitable material with an evaporated metal layer on surface 40 to provide an optical reflecting surface. This structure is similarly mounted in a suitable housing and its entrance aperture area is defined between clamping members 44, 46 and a shield member 48. Radiation from the distant source passes through the entrance apertures, impinges on the surfaces 40 and is reflected from those surfaces onto a bank of detector cathodes 50 which are disposed in a line across the entire effective width of the instrument and perpendicular to the axis thereof. These detectors may be of the open cathode photomultiplier type with the cathode positioned at an angle of approximately 45°. X-radiation impinging on the surface causes generation of electrons which enter the associated photomultiplier tubes 52 and are amplified so that the sensed signal may be appropriately recorded by the electronic circuitry 54. The configuration and dimensions of the planar collimator surfaces 40 are governed by the same criteria as those discussed above for the conical collimator structure. This system enables more effective searching of large areas of interest for detection of weak X-ray sources in contrast with the embodiment of FIGS. 1–3 which, with its high angular resolution, enables the location of the source of X-rays to be pinpointed with accuracy but is more difficult to use in searching for remote X-ray sources whose locations are not known.

Another embodiment of the invention is shown in FIG. 5 in which a series of comparatively thin plates 60 are secured in a stack and positioned in a plane perpendicular to the axis of the instrument. The plates 60 may be of planar (as indicated in FIG. 6), conical or other suitable configurations. The stack of plates are clamped between stops 62 and front wall member 64 in a suitable housing structure 66 in which a detector is located at the focus point (or line—depending on the configuration of the reflection plates 60) 68 of reflected radiation in similar manner to the previously described devices. The reflecting structures 60 shown in FIGS. 5 and 6 are thin members which are inclined at a series of angles so that radiation entering the instrument parallel to the axis thereof strikes any one of them at grazing incidence, the criteria necessary for the reflection of soft X-rays. The plates 60 are maintained in the desired relation by spacers 70 and are preferentially graded in length parallel to the instrument axis so that reflections from each occupies the same deflector area as in the other embodiment. In this embodiment the smallest angled plates are nearest the instrument axis and the largest angled plates are most remote from that axis. The two sets of plates, upper and lower, are preferably positioned symmetrically with respect to the axis of the instrument. In general the principles of construction and operation of this embodiment are identical to the other disclosed embodiments, with the additional advantage of shorter overall length for a given collecting area. A shield 72 of a configuration closely conforming in shape to the spacing between the plates closest to the axis of the instrument blocks radiation from directly impinging on the detector at the focus 68. In this embodiment (stacked plates) the collecting area (A) for a given length system and the figure of merit (G) are both substantially increased over them for the embodiments of FIGS. 1–4.

Thus it will be seen that the invention provides improved instruments particularly adapted for observing soft X-rays from extraterrestial sources. The invention has as principal advantages the large radiation collection area, the high resolution and the large resulting signal to noise ratio. It is capable of being utilized in various configurations, both for high angular resolution applications and in search applications. While several embodiments have been shown in the drawings and described in detail it will be seen by those skilled in the art that the disclosed structures may be varied in certain obvious respects and therefore it is not intended that the invention be limited to the specific described embodiments or to details thereof and departures may be made therefrom within the spirit and scope of the invention as defined in the claims.

We claim:

1. In an instrument for sensing X-radiation generated from a source located a great distance from the instrument, said instrument including an entrance aperture and an X-ray detector having an area a small fraction of the area of said entrance aperture, a reflection collimator positioned between said entrance aperture and said detector comprising a series of optically smooth ruled surfaces each disposed at a grazing angle to radiation incident on said surface from said source, each said surface being disposed at a slightly different angle from all other surfaces in said collimator and being arranged to deflect impinging radiation from said source directly on to said detector.

2. In an instrument for sensing X-radiation generated from a source located a great distance from the instrument, said instrument including an entrance aperture and an X-ray detector having an area a small fraction of the area of said entrance aperture disposed on the axis of said instrument, a reflection collimator positioned between said entrance aperture and said detector comprising a series of optically smooth ruled surfaces, said surfaces being arranged in a gradated series of grazing angles to radiation from said source incident on said surfaces and each surface having a dimension parallel to the incident radiation such that the projected widths of said surfaces exposed to said radiation are substantially equal, and each surface being arranged to substantially totally externally reflect impinging radiation from said source directly on to said detector.

3. The apparatus as claimed in claim 2 wherein the series of surfaces extends generally parallel to the axis of said instrument with the angle at which each surface is disposed increasing from the area of the entrance aperture toward the detector.

4. The apparatus as claimed in claim 2 wherein the series of surfaces extends generally perpendicularly to the axis of said instrument with the angle at which each surface is disposed increasing as a function of the distance of the surface from said axis.

5. The apparatus as claimed in claim 2 wherein said surfaces are conical surfaces.

6. The apparatus as claimed in claim 2 wherein said surfaces are planar surfaces.

7. An instrument for sensing X-radiation generated from a source located distantly from the instrument comprising an elongated housing having an axis, an entrance aperture at one end of said housing, an X-radiation detector mounted within said housing on the axis of said instrument at a point remote from said entrance aperture, a reflection collimator mounted within said housing between said entrance aperture and said X-radiation detector, said collimator including an optically smooth surface, every portion of said surface being disposed at an angle of the range of 0° to 8° to incident radiation from said distant source and being arranged to substantially totally externally reflect radiation impinging thereon directly onto said X-radiation detector, an aperture in said collimator at the end remote from said entrance aperture positioned coaxially with the axis of said instrument and a radiation barrier located on the axis of said collimator in said entrance aperture to block radiation from said source from directly impinging on said detector while permitting radiation to impinge on said surface, said radiation barrier being of substantially the same shape as said collimator aperture.

8. The instrument as claimed in claim 7 wherein said collimator surface extends generally parallel to the axis of said instrument with the angle of said surface to incident radiation from said distant source increasing toward the location of said detector.

9. An instrument for sensing X-radiation generated from a source located distantly from the instrument comprising an elongated housing having an axis, an entrance aperture at one end of said housing, a reflection collimator mounted within said housing including a series of optically smooth ruled surfaces, each said ruled surface being disposed at a grazing angle to radiation entering said housing through said entrance aperture, and each being disposed at at least a slightly different angle from all other ruled surfaces in said collimator so that each of said ruled surfaces deflects impinging radiation directly on to a common detector area positioned in said housing on said axis at a location remote from said entrance aperture, an X-ray detector positioned at the common area to which X-radiation is deflected by said ruled surfaces, and an opaque radiation barrier positioned in said entrance aperture on the axis of said collimator to prevent radiation from said source from directly impinging on said detector while permitting radiation to impinge on said ruled surfaces.

10. An instrument for sensing X-radiation generated from a source located distantly from the instrument comprising an elongated housing having an axis, an entrance aperture at one end of said housing, an X-radiation detector mounted within said housing on the axis of said instrument at a point remote from said entrance aperture, and a reflection collimator mounted within said housing between said entrance aperture and said X-radiation detector, said collimator including a series of optically smooth ruled surfaces, each said ruled surface being disposed at a grazing angle to radiation entering said housing through said entrance aperture, and each being disposed at a slightly different angle from all other ruled surfaces so that each of said ruled surfaces deflects impinging radiation from said source directly onto said X-radiation detector, said X-radiation detector having a dimension that is a function of said equal projected widths of said ruled surfaces.

11. The instrument as claimed in claim 10 and further including an opaque radiation barrier positioned in said entrance aperture on the axis of said instrument to prevent radiation from said source from directly impinging on said X-radiation detector while permitting radiation to impinge on said ruled surfaces.

12. The apparatus as claimed in claim 10 wherein the series of surfaces extends generally parallel to the axis of said instrument with the angle at which each surface is disposed increasing from the area of the entrance aperture toward the detector.

13. The apparatus as claimed in claim 10 wherein the series of surfaces extends generally perpendicularly to the axis of said instrument with the angle at which each surface is disposed increasing as a function of the distance of the surface from said axis.

14. The apparatus as claimed in claim 10 wherein said surfaces are conical surfaces.

15. The apparatus as claimed in claim 10 wherein said surfaces are planar surfaces.

16. An instrument for sensing X-radiation generated from a source located distantly from the instrument comprising an elongated housing having an axis, an entrance aperture at one end of said housing, an X-radiation detector mounted within said housing on the axis of said instrument at a point remote from said entrance aperture, a reflection collimator mounted within said housing between said entrance aperture and said X-radiation detector, said collimator including a series of optically smooth conical surfaces, each said conical surface being disposed at a grazing angle to the axis of the cone, with the axes of said conical surfaces being aligned with the axis of said instrument, each said surface having a length parallel to its axis such that the projected width of the surface perpendicular to its said axis is equal to the projected width of each of the others of said collimator surfaces, each said surface being disposed at a slightly different angle from all other conical surfaces, so that each of said conical surfaces deflects impinging radiation from said source directly onto said X-radiation detector, said X-radiation detector having a circular shape with a radius that is equal to one of said projected widths of said conical surfaces, an aperture in said collimator at the end thereof remote from said entrance aperture, and a circular radiation barrier positioned in said entrance aperture on the axis of said instrument to prevent radiation from said source from directly impinging on said X-radiation detector while permitting radiation to impinge on said conical surfaces, said radiation barrier having the same diameter as said collimator aperture.

References Cited in the file of this patent

UNITED STATES PATENTS

| | | |
|---|---|---|
| 1,519,448 | Gamain | Dec. 16, 1924 |
| 1,865,441 | Mutscheller | July 5, 1932 |
| 2,474,240 | Friedman | June 28, 1949 |
| 2,688,095 | Andrews | Apr. 27, 1954 |
| 2,819,404 | Herrnring et al. | Jan. 7, 1958 |

FOREIGN PATENTS

| | | |
|---|---|---|
| 561,465 | Canada | Aug. 5, 1958 |